United States Patent
Mensa-Wilmot et al.

[11] Patent Number: 5,906,246
[45] Date of Patent: May 25, 1999

[54] PDC CUTTER ELEMENT HAVING IMPROVED SUBSTRATE CONFIGURATION

[75] Inventors: Graham Mensa-Wilmot, Houston; Carl W. Keith, Spring; Tommy G. Ray, Houston, all of Tex.

[73] Assignee: Smith International, Inc., Houston, Tex.

[21] Appl. No.: 08/701,855

[22] Filed: Sep. 4, 1996

Related U.S. Application Data

[63] Continuation-in-part of application No. 08/663,516, Jun. 13, 1996, abandoned
[60] Provisional application No. 60/024,610, Aug. 26, 1996.

[51] Int. Cl.$^6$ .......................... E21B 10/46; E21B 10/56
[52] U.S. Cl. .................. 175/432; 76/108.2; 451/540
[58] Field of Search .................. 175/428, 432; 76/108.2; 407/118; 51/295; 451/540

[56] References Cited

U.S. PATENT DOCUMENTS

| | | | |
|---|---|---|---|
| 4,109,737 | 8/1978 | Bovenkerk | 175/430 |
| 4,629,373 | 12/1986 | Hall | 407/118 |
| 4,716,975 | 1/1988 | Dennis | 175/432 |
| 4,784,023 | 11/1988 | Dennis | 76/108.2 |
| 4,954,139 | 9/1990 | Cerutti | 51/293 |
| 4,972,637 | 11/1990 | Dyer | 51/295 |
| 4,984,642 | 1/1991 | Renard et al. | 175/329 |
| 4,997,049 | 3/1991 | Tank et al. | 175/430 |
| 5,007,207 | 4/1991 | Phaal | 451/548 |
| 5,011,515 | 4/1991 | Frushour | 51/307 |
| 5,037,451 | 8/1991 | Burnand et al. | 51/293 |
| 5,120,327 | 6/1992 | Dennis | 51/293 |
| 5,217,081 | 6/1993 | Waldenström et al. | 175/420.2 |
| 5,351,772 | 10/1994 | Smith | 175/428 |
| 5,355,969 | 10/1994 | Hardy et al. | 175/432 |
| 5,379,854 | 1/1995 | Dennis | 175/434 |
| 5,435,403 | 7/1995 | Tibbitts | 175/432 |
| 5,469,927 | 11/1995 | Griffin | 175/432 |
| 5,472,376 | 12/1995 | Olmstead et al. | 451/540 |
| 5,477,034 | 12/1995 | Dennis | 219/615 |
| 5,484,330 | 1/1996 | Flood et al. | 451/540 |
| 5,484,468 | 1/1996 | Östlund et al. | 75/236 |
| 5,590,728 | 1/1997 | Matthias et al. | 175/432 |
| 5,598,750 | 2/1997 | Griffin et al. | 76/108.2 |
| 5,617,928 | 4/1997 | Matthias et al. | 175/432 |
| 5,622,233 | 4/1997 | Griffin | 175/432 |
| 5,711,702 | 1/1998 | Devlin | 175/432 X |

FOREIGN PATENT DOCUMENTS

| | | |
|---|---|---|
| 0322214 | 12/1988 | European Pat. Off. . |
| 0462955 | 6/1991 | European Pat. Off. . |
| 0691167 | 1/1996 | European Pat. Off. . |
| 2275068 | 8/1994 | United Kingdom . |
| 2290328 | 12/1995 | United Kingdom . |

*Primary Examiner*—David J. Bagnell
*Attorney, Agent, or Firm*—Conley, Rose & Tayon, P.C.

[57] ABSTRACT

A supporting substrate for supporting a diamond layer on a cutting element is disclosed which has an irregular surface defining the interface between the substrate and the diamond layer. The irregularities in the surface comprise closed loops that may vary in amplitude, frequency or both. The irregularities may comprise ridges or grooves or a combination of ridges and grooves.

22 Claims, 6 Drawing Sheets

PDC CUTTER ELEMENT HAVING IMPROVED SUBSTRATE CONFIGURATION

This application is a continuation-in-part of Ser. No. 08/663,516, filed Jun. 13, 1996, now abandoned and titled "PDC Cutter Element Having Improved Substrate Configuration." This Application also claims the benefit of U.S. provisional application Ser. No. 60/024,610, filed Aug. 26, 1996.

TECHNICAL FIELD OF THE INVENTION

The present invention relates generally to cutting elements for use in earth-boring drill bits and, more specifically, to a means for increasing the life of cutting elements that comprise a layer of superhard material, such as diamond, affixed to a substrate. Still more particularly, the present invention relates to a polycrystalline diamond compact comprising a supporting substrate and a diamond layer supported thereon, wherein the supporting substrate includes a plurality of projections having defined frequencies, amplitudes and/or configurations.

In a typical drilling operation, a drill bit is rotated while being advanced into a soil or rock formation. The formation is cut by cutting elements on the drill bit, and these cuttings are flushed from the borehole by the circulation of drilling fluid toward the top of the borehole. The drilling fluid is delivered to the drill bit through a passage in the drill stem and is ejected outwardly through nozzles in the cutting face of the drill bit. The ejected drilling fluid is directed outwardly through the nozzles at high speed to aid in cutting, and to flush the cutting and cool the cutter elements.

Conventional cutting elements typically comprise a stud or cylinder having a supporting surface at one end, and a cutting disk mounted on the supporting surface. The disk comprises a substrate having one surface bonded to the supporting surface and a second surface that carries a diamond substance such as a layer of polycrystalline diamond or thermally stable diamond. The stud and substrate are normally formed of a hard material such as tungsten carbide (WC). Alternatively, the diamond layer can be directly applied to the carbide stud or cylinder. The techniques for constructing polycrystalline diamond (PDC) cutting elements are generally well known will not be described in detail. They can be summarized as follows: a carbide substrate is formed having a desired surface configuration on each of its first and second surfaces; the substrate is placed in a mold with a superhard material, such as diamond powder, and subjected to high temperature, high pressure pressing, resulting in the formation of a diamond layer bonded to the substrate surface; and the substrate is braze-bonded to the stud or cylinder. At present, the interface between the superhard cutting layer and the substrate is typically planar, although some non-planar diamond/substrate interfaces have been disclosed.

Although cutting elements having this configuration have significantly expanded the scope of formations for which drilling with diamond bits is economically viable, the interface between the substrate and the diamond layer continues to be a limiting factor, as it is prone to failure, resulting in delamination, spalling and/or chipping of the diamond layer. There are several possible explanations for the failure of this interface. One explanation is that the interface between the diamond and the substrate is subject to high residual stresses resulting from the manufacturing processes of the cutting element. Specifically, because manufacturing occurs at elevated temperatures, during cooling the differing coefficients of thermal expansion of the diamond and substrate material result in thermally-induced stresses. In addition, finite element analysis (FEA) has demonstrated that during cutting high stresses are localized in both the outer diamond layer and at the tungsten carbide interface. Finally, the cutting elements are subjected to extremes of temperature and heavy loads when the drill bit is in use. It has been found that during drilling, shock waves may rebound from the internal planar interface between the two layers and interact destructively. All of these phenomena are deleterious to the life of the cutting element during drilling operations, as the stresses, when augmented by stresses attributable to the loading of the cutting element by the formation, may cause spalling, fracture and even delamination of the diamond layer from the substrate. In addition to the foregoing, state of the art cutting elements often lack sufficient diamond volume to cut highly abrasive formations, as the thickness of the diamond layer is limited by the resulting high residual stresses and the difficulty of bonding a relatively thick diamond layer to a planar substrate.

Hence, it is desired to provide a new and improved preform cutting element that overcomes or reduces the spalling and delamination problems referred to above.

SUMMARY OF THE INVENTION

The present invention provides a supporting substrate for a PDC compact wherein the substrate is provided with an irregular or asymmetric amplitude and/or frequency modulated surface to which the abrasive layer is affixed. The substrate surface may comprise various irregular features, including but not limited to irregular undulations, rings, spirals, or protrusions having various other shapes and/or combinations of shapes. The surface features may vary in height (amplitude), spacing (wavelength) or both.

One embodiment of the present invention comprises an asymmetrical substrate surface in which irregular undulations increase in height and/or spacing adjacent one side of the surface and decrease in height and/or spacing adjacent the opposite side of the surface. This produces a dual purpose substrate, whose orientation can be adjusted to maximize performance.

BRIEF DESCRIPTION OF THE DRAWINGS

For an introduction to the detailed description of the preferred embodiments of the invention, reference will now be made to the accompanying drawings, wherein.

DETAILED DESCRIPTION OF THE INVENTION

Figure 1A:
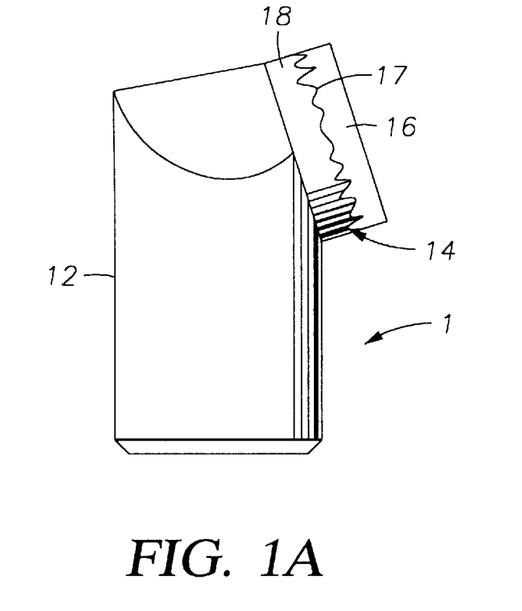
FIG. 1 is a side elevational view of a cutting element according to the present invention.
Figure 1B:
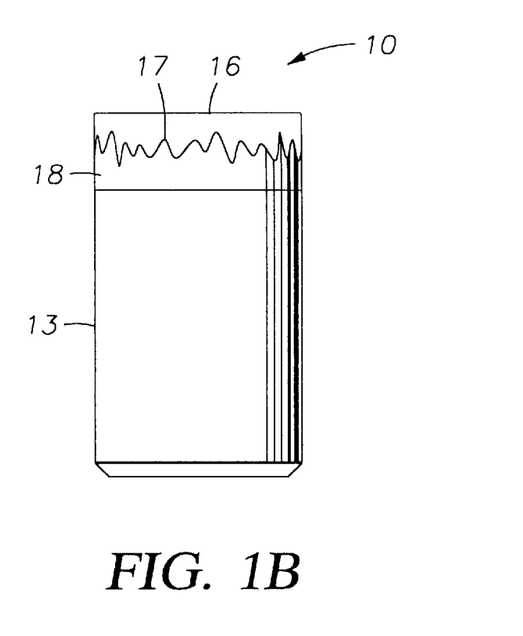
Figure 1C:
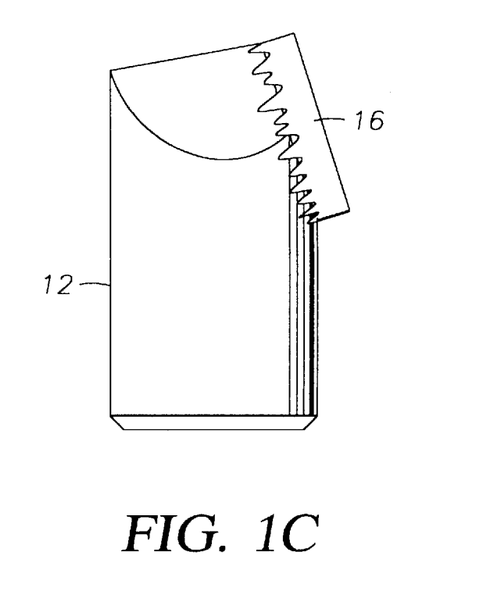
Figure 1D:
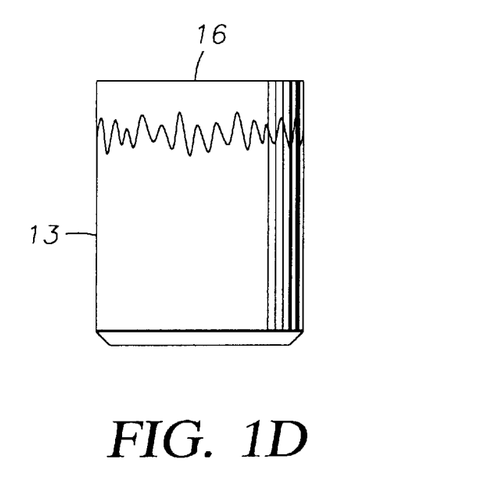

Referring initially to FIG. 1A, a cutting element 10 in accordance with the present invention comprises a stud 12 and a disc-shaped cutting compact 14 bonded thereto. As is known in the art, cutting compact 14 comprises a diamond layer 16 affixed to the surface 17 of supporting substrate 18. The present invention is directed to providing an improved stress distribution between substrate 18 and diamond layer 16, which enhances performance. Alternatively, cutting element could comprise a cylinder 13 with the cutting compact affixed perpendicularly to the axis of the cylinder, as shown in FIG. 1B, or the diamond compact could be affixed directly to the stud, as shown in FIGS. 1C and D. In any event, the present invention is directed to providing an improved bond between the diamond compact and the surface on which it is mounted. Thus, while the invention is described hereinafter in terms of the surface 17 of a supporting substrate 18, it will be understood that it is equally applicable to all of the configurations shown in FIGS. 1A–D, as well as to other applications in which diamond compacts and inserts are used.

Figure 2A:
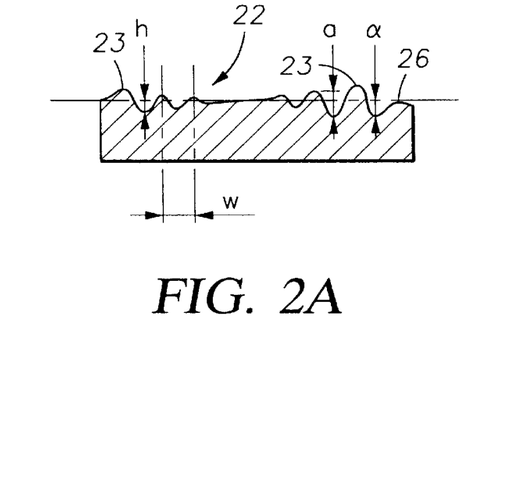
FIGS. 2A and 2B are cross-sectional and perspective views, respectively, of a first embodiment of the present substrate layer.
Figure 2B:
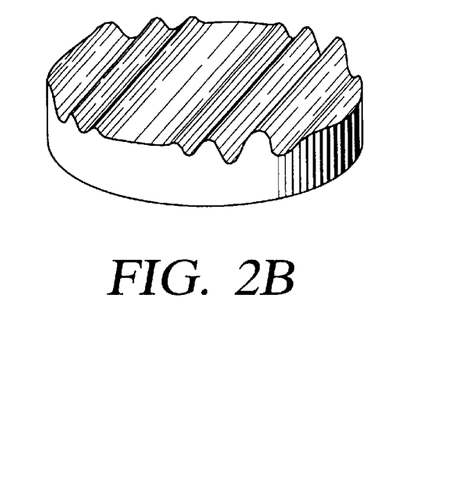

Referring now to FIGS. 2A and 2B, one embodiment of the present substrate 20 includes a plurality of undulations 22 extending across the face of the substrate and defining a plurality of ridges 23 and valleys 24. A centerline 26 (shown in phantom) is defined as passing through the center point of each successive ridge face, with the center point being equidistant from the peak and nadir of that face. The height h of a given ridge 23 is defined as the vertical (as drawn) distance from the peak of that ridge to the centerline 26. The depth d of a given valley 24 is defined as the vertical (as drawn) distance from the nadir of that valley to the centerline 26. The amplitude a of a given ridge/valley combination is defined as the vertical (as drawn) distance from the peak of a given ridge to the nadir of an adjacent valley. The wavelength w of a given ridge/valley combination is defined as the lateral (as drawn) distance from the peak of a given ridge to the peak of an adjacent ridge.

In accordance with the principles of the present invention, the surface of substrate 20 is configured such that at least one of either the amplitude a or the wavelength w is non-constant across the face of substrate 20. More specifically, the amplitude may be increasing while the wavelength is constant or increasing, or the amplitude may be decreasing while the wavelength is constant or increasing. It will be understood that no particular orientation of the substrate surface is specified, as the principles of the present invention describe relative magnitudes. Thus, undulations that appear to be "increasing" as drawn may be described as "decreasing" when viewed from another perspective, and vice versa.

Figure 3A:
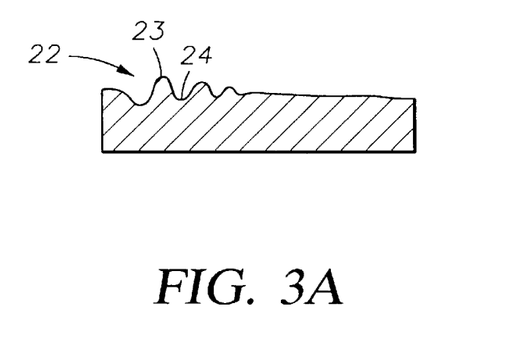
FIGS. 3A and 3B are cross-sectional and perspective views, respectively, of a second embodiment of the present substrate layer.
Figure 3B:
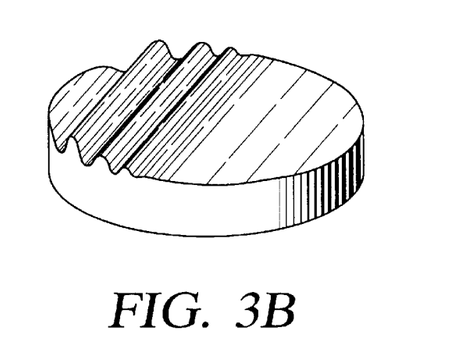

According to the embodiment shown in FIGS. 3A and 3B, the amplitude and wavelength of the undulations are both greatest at the same side of the substrate. In this manner, an asymmetric substrate is formed, having large undulations at one edge, which taper off to much smaller undulations, if any, at the opposite edge. It is believed that the asymmetric compact formed using such an asymmetric substrate will be advantageous, in that it is capable of providing a dual purpose cutting surface in a single insert. Thus, the insert can be oriented to provide the optimal balance of abrasion resistance and impact resistance, depending on the application for which it is to be used.

Figure 4A:
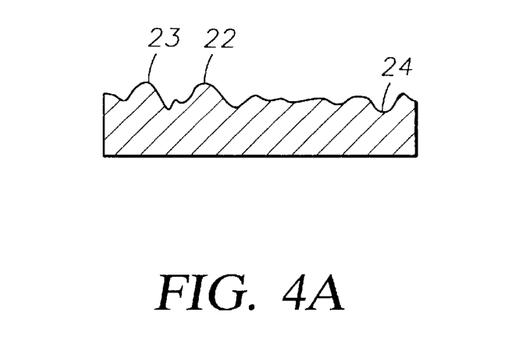
FIGS. 4A and 4B are cross-sectional and perspective views, respectively, of a third embodiment of the present substrate layer.
Figure 4B:
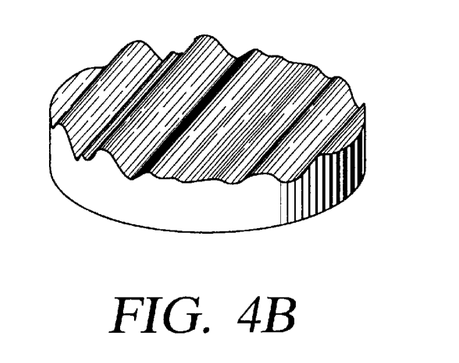

Alternatively, the present invention also includes substrate surfaces wherein the relationship of adjacent pairs of ridges varies or is irregular, rather than constant. That is, as shown in FIGS. 4A and 4B, the amplitude and wavelength of the undulations 22 can vary simultaneously, independently and without pattern. It will be further understood that the undulations 22 described above can be oriented so as to lie either across the cutting path or parallel to it without departing from the spirit of the present invention. Likewise, the average amplitude of the undulations can be largest in one portion of the substrate surface, while the average wavelength of the undulations is largest in another portion of the substrate surface. In addition, while the undulations shown in FIGS. 4A and 4B are substantially straight, it will be understood that the principles of the present invention could be carried out using crooked or wavy undulations.

Figure 5A:
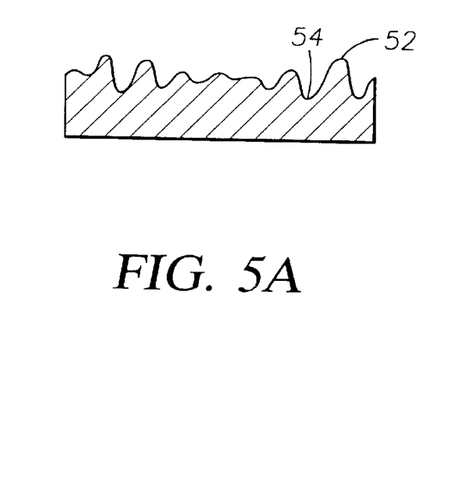
FIGS. 5A and 5B are cross-sectional and perspective views, respectively, of a fourth embodiment of the present substrate layer.
Figure 5B:
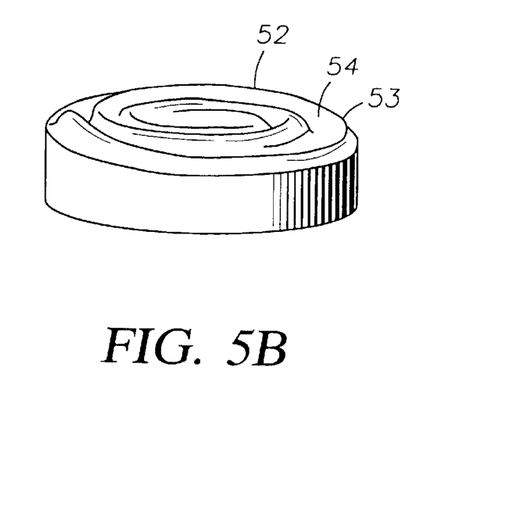
Figure 6A:
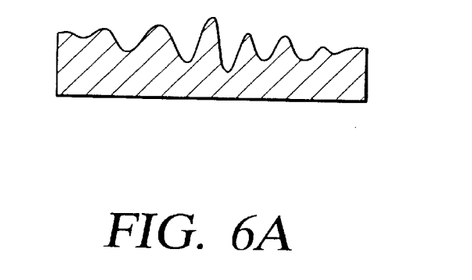
FIGS. 6A and 6B are cross-sectional and perspective views, respectively, of a fifth embodiment of the present substrate layer.
Figure 6B:
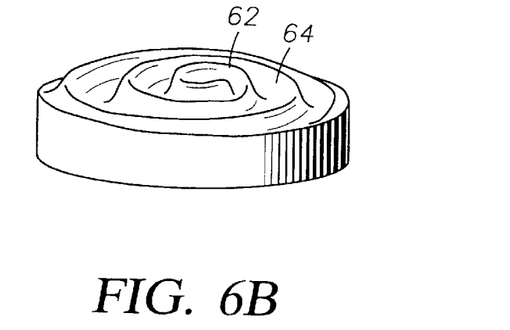

Still another alternative embodiment of the present invention is shown in FIGS. 5A and 5B, wherein a single ridge 52 and valley 54 define a spiral 53 in which the amplitude of ridge 52 and 52 valley 54 is greatest at the perimeter of the substrate and decreases as the radius of the ridge decreases. Alternatively, as shown in FIGS. 6A and 6B, the amplitude of ridge 62 and valley 64 can be smallest adjacent the perimeter of the substrate and increase toward the center.

Figure 7A:
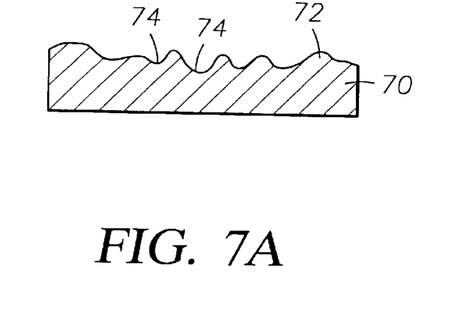
FIGS. 7A and 7B are cross-sectional and perspective views, respectively, of a sixth embodiment of the present substrate layer.
Figure 7B:
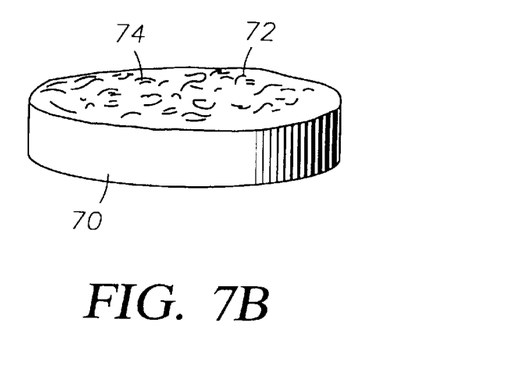

Still another embodiment of the present invention, shown in FIGS. 7A and 7B, encompasses a substrate 70 having a contoured surface 71 that includes a plurality of variously sized projections 72 and indentations 74. These serve the same purpose as undulations 22 and valleys 24, namely a reduction in stress concentration and corresponding increase in the ability of the diamond layer to remain affixed to the substrate. It is preferred that projections 72 and indentations 74 vary in height and diameter, including either regular or irregular variations in at least one of these parameters.

Figure 8:
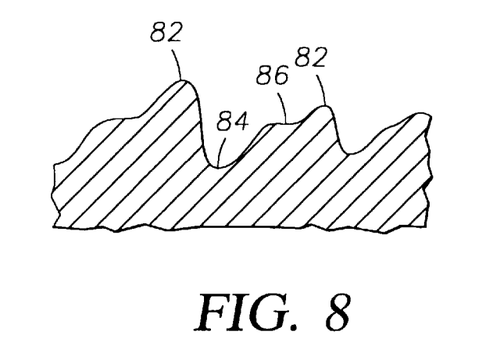
FIGS. 8, 9 and 10 are cross-sectional views of alternative embodiments of the surface devices of the present invention.
Figure 9:
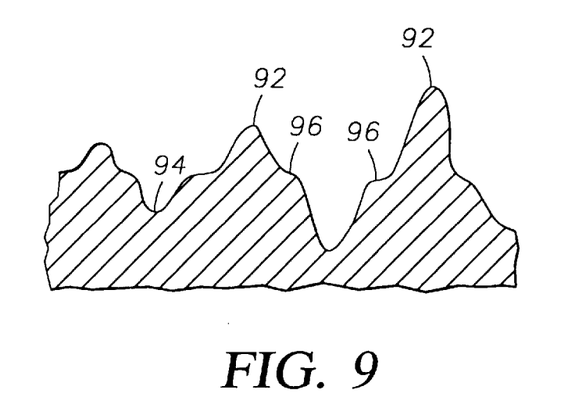
Figure 10:
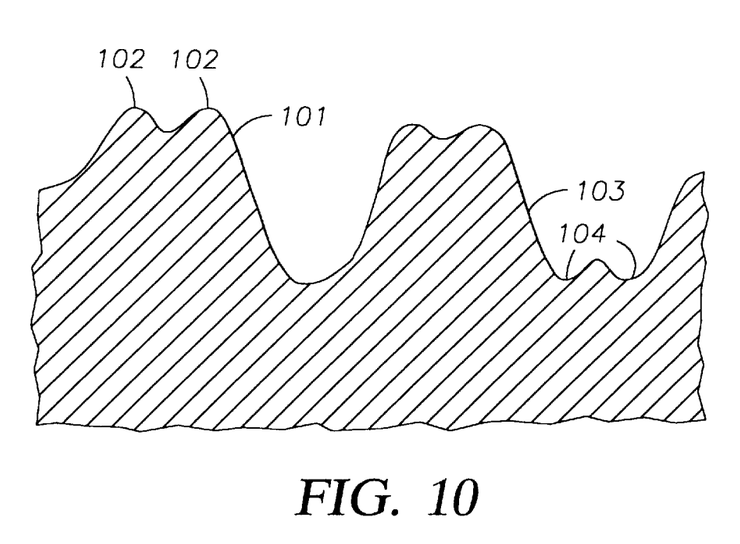

In the embodiments described above, undulations 22 are depicted as generally sinusoidal. The principles of the present invention can also be applied to substrate configurations wherein the surface projections have other shapes. Some alternative shapes are shown in FIGS. 8 and 9, although the alternative shapes depicted therein are not intended to be an exhaustive list of possible alternatives. FIG. 8 shows a pair of ridges 82 and an intervening valley 84, in which the ridges 82 and the valley 84 each include a single inflection or shoulder 86. FIG. 9 shows a pair of ridges 92 and an intervening valley 94, in which the ridges 92 and the valley 94 each include a pair of inflections or shoulders 96. The waveforms shown in FIGS. 8 and 9, as well as variations thereof, can be have either constant or varying amplitudes and/or frequencies. As shown in FIG. 10, each ridge 101 may include more than one maximum 102 and each valley 103 may include more than one minimum 104. For ease of reference hereinafter, maxima 103 and minima 104 are referred to as points of zero slope. In addition, the foregoing waveforms can be combined or superimposed in a variety of ways.

Figure 11A:
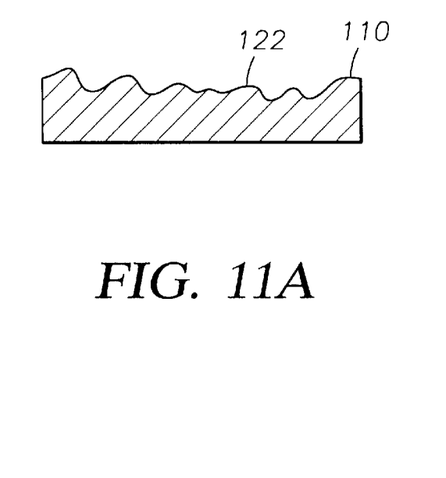
FIGS. 11A and 11B are cross-sectional and perspective views, respectively, of a seventh embodiment of the present substrate layer.
Figure 11B:
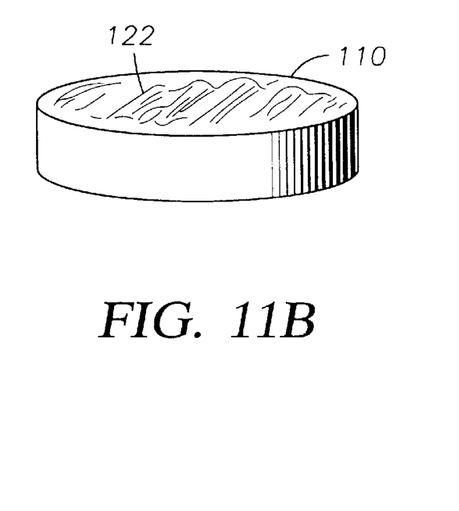

In still another embodiment, the surface of the substrate may include some combination of the foregoing devices. By way of example only, FIGS. 11A and 11B show a surface comprising a ring 110 surrounding a plurality of undulations 122. It will be understood that the reverse is also applicable, in that the surface can include one or more undulations surrounding one or more rings or other devices. It will further be understood that undulations 122, and any other surface device described herein, need not be straight or linear, but may be curvilinear or wavy, or have any other desired configuration.

Figure 12A:
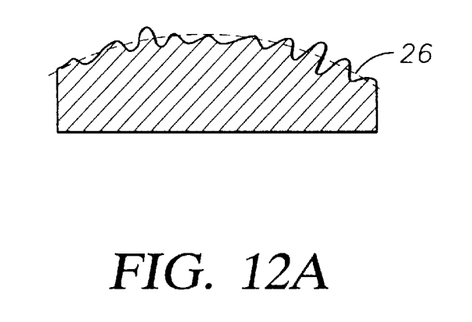
FIGS. 12A and 12B are cross-sectional and perspective views, respectively, of an eighth embodiment of the present substrate layer.
Figure 12B:
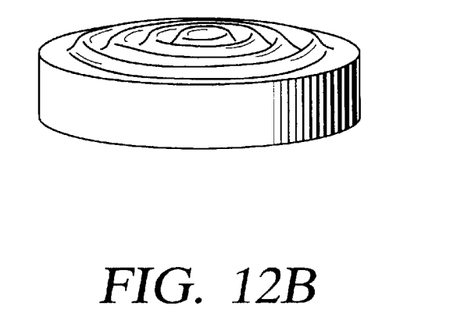

Likewise, as shown in FIGS. 12A and 12B, either the substrate itself or the centerline of the features can define a convex or concave shape. If the substrate surface is convex (domed), the diamond layer may be thickest around the perimeter of the compact, while if the substrate surface is concave (bowl-shaped), the diamond layer will be thickest at the center of the compact. It will be understood that neither the concave nor the convex embodiment need be symmetrical, i.e. the center of the dome or hollow can be elsewhere than at the center of the substrate surface.

Figure 13A:
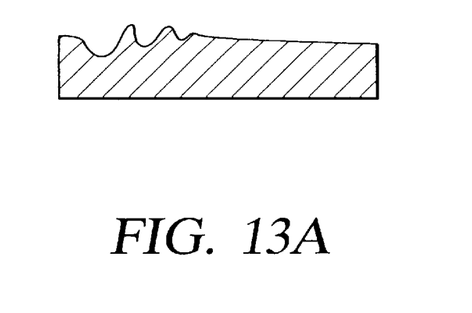
FIGS. 13A and 13B are cross-sectional and perspective views, respectively, of a ninth embodiment of the present substrate layer.
Figure 13B:
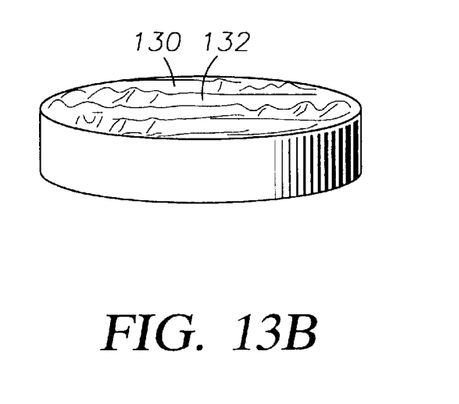

In still another embodiment, shown in FIGS. 13A and 13B, the surface can be divided into a plurality of sectors 130, 132 in which the average amplitude of the surface features decreases in opposite directions. Alternatively or in addition, the frequency of the features can vary from sector to sector. Furthermore, features that are shown decreasing could increase and features shown to be increasing could decrease in the same manner.

Figures 14A, 15A:
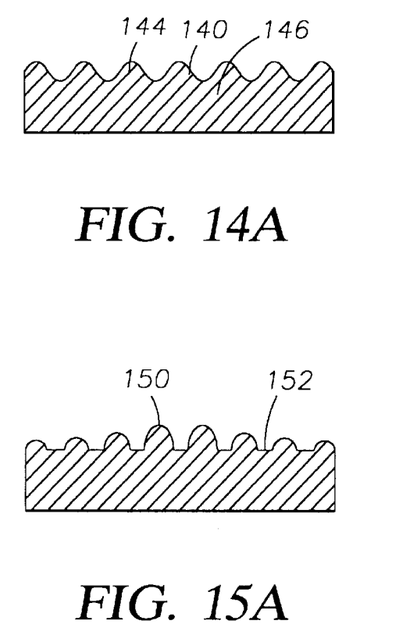
FIGS. 14A and 14B are cross-sectional and perspective views, respectively, of a tenth embodiment of the present substrate layer.
FIGS. 15A and 15B are cross-sectional and perspective views, respectively, of a eleventh embodiment of the present substrate layer.
Figure 14B:
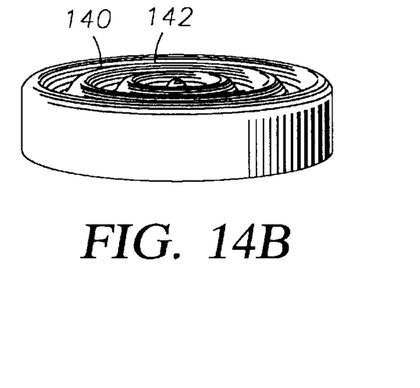

Referring now to FIGS. 14A and 14B, another embodiment of the present invention has one or more surface features 140 that each describe a closed loop 142 on the surface. The closed loops 142 can be nested and generally circular, as shown, or not. As best shown in FIG. 14A, surface features 140 comprise undulations that comprise both ridges 144 and valleys 146, to which any of the variations described above apply, including, but not limited to, variations in amplitude, variations in wavelength, and the addition of shoulders.

Figure 15B:
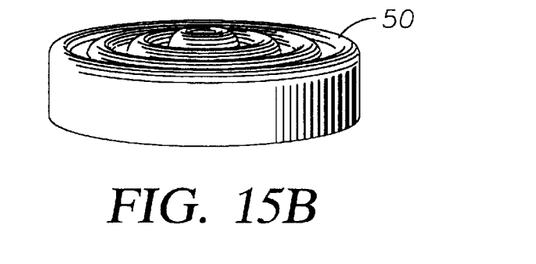
Figure 16A:
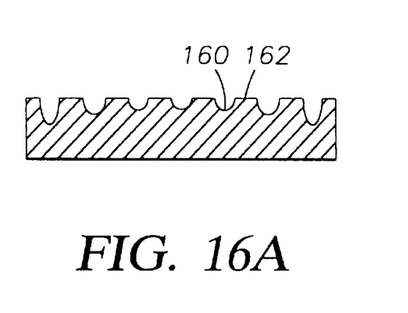
FIGS. 16A and 16B are cross-sectional and perspective views, respectively, of a twelfth embodiment of the present substrate layer.
Figure 16B:
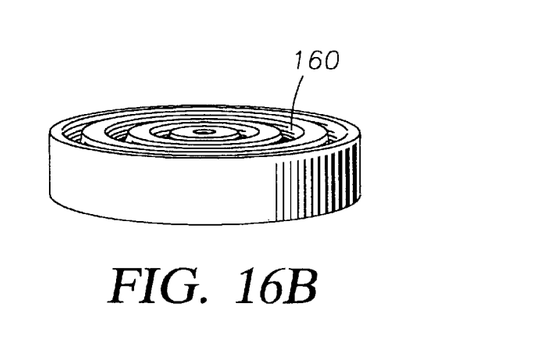
Figure 17A:
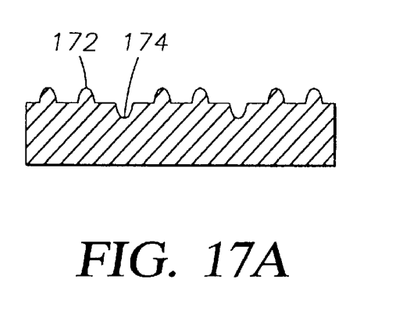
FIGS. 17A and 17B are cross-sectional and perspective views, respectively, of a thirteenth embodiment of the present substrate layer.
Figure 17B:
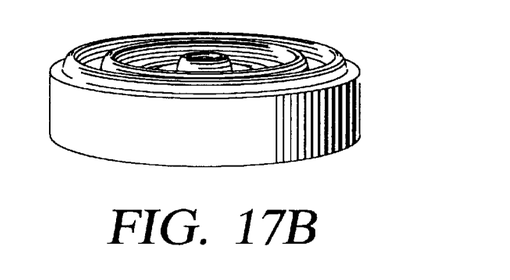

In the alternative, the surface may include either ridges or valleys. These embodiments, shown in FIGS. 15A–B and 16A–B, are referred to hereinafter as "ridged" and "grooved" surfaces respectively. In each case, approximately one-half of the waveform is eliminated, leaving only ridges 150 extending into the diamond layer (FIGS. 15A and 15B) or grooves 160 extending into the substrate layer (FIGS. 16A and 16B). Between the ridges or grooves are relatively flat intervening areas 152, 162. By "relatively flat" it is meant that the amplitude of any surface modulation in intervening areas 152, 162 is significantly less than the amplitude of ridges 150 or grooves 160. For example, intervening areas 152 and 162 can be slightly convex, flat, slightly concave or wavy. As discussed above with respect to earlier embodiments, the amplitude of ridges 150 and grooves 160 can vary randomly across the surface, increase generally toward the center of the surface (as shown in FIGS. 15A and 15B), or decrease generally toward the center of the surface (as shown in FIGS. 16A and 16B). Likewise ridges 172 and grooves 174 can both be used on a single substrate, as shown in FIGS. 17A and 17B.

While various preferred embodiments of the invention have been shown and described, modifications thereof can be made by one skilled in the art without departing from the spirit and teachings of the invention. For example, the insert and/or substrate need not be round, but may be ovoid, truncated, or any of several other known cutter shapes.

What is claimed is:

1. A compact for use on a cutting element for an earth boring bit, comprising:
    a substrate having a supporting surface; and
    a superhard layer bonded to said supporting surface;
    wherein said supporting surface includes a surface feature, said surface feature defining at least two closed loops centered at the center of said supporting surface and having differing amplitudes.

2. The compact according to claim 1 wherein said superhard layer is selected from the group consisting of diamond and PCBN.

3. The compact according to claim 1 wherein said supporting surface includes at least three of said surface features.

4. The compact according to claim 3 wherein said surface features have varying amplitudes.

5. The compact according to claim 3 wherein said surface features have varying frequencies.

6. The compact according to claim 3 wherein said surface features have varying amplitudes and frequencies.

7. The compact according to claim 3 wherein said closed loop surface features are generally circular.

8. The compact according to claim 3 wherein said closed loop surface features are nested.

9. A compact for use on a cutting element for an earth boring bit, comprising:
    a substrate having a supporting surface; and
    an abrasive layer bonded to said supporting surface;
    wherein said supporting surface includes a plurality of ridges, said ridges defining a plurality of nested closed loops having varying amplitudes.

10. The compact according to claim 9 wherein said ridges increase in amplitude toward the center of the second surface.

11. The compact according to claim 9 wherein said ridges decrease in amplitude toward the center of the second surface.

12. The compact according to claim 9 wherein said ridges are separated by relatively flat areas.

13. The compact according to claim 9, further including at least one groove on said surface.

14. A compact for use on a cutting element for an earth boring bit, comprising:
    a substrate having a supporting surface; and
    an abrasive layer bonded to said supporting surface;
    wherein said supporting surface includes a plurality of grooves defining a plurality of closed loops having different amplitudes and centered on said supporting surface.

15. The compact according to claim 14 wherein said grooves increase in amplitude toward the center of the second surface.

16. The compact according to claim 14 wherein said grooves decrease in amplitude toward the center of the second surface.

17. The compact according to claim 14 wherein said grooves define a plurality of nested closed loops.

18. The compact according to claim 14 wherein said grooves are separated by relatively flat areas.

19. The compact according to claim 14, further including at least one ridge on said surface.

20. A cutting element for an earth boring bit, comprising:
   a stud having first and second ends, said first end being adapted for attachment to a bit;
   a substrate having first and second substantially opposed surfaces, said first surface affixed to said second stud end; and
   an abrasive cutting layer affixed to said second substrate surface;
   wherein said second substrate surface includes a plurality of undulations having varying amplitudes, at least one of said undulations defining a closed loop, said closed loop being centered on said second substrate surface.

21. The cutting element according to claim 20 wherein said undulations have varying frequencies.

22. The cutting element according to claim 20 wherein said undulations comprise a plurality of nested closed loops.

* * * * *